United States Patent [19]

Yench

[11] 4,113,303

[45] Sep. 12, 1978

[54] ROOF STRUCTURE FOR AN AUTOMOBILE

[76] Inventor: Charles G. Yench, 3921 E. La Palma Suite Q, Anaheim, Calif. 92806

[21] Appl. No.: 786,039

[22] Filed: Apr. 8, 1977

[51] Int. Cl. ............................................. B60J 7/18
[52] U.S. Cl. ................................. 296/137 B; 49/465
[58] Field of Search ................. 296/137 B, 137 J, 91; 49/463, 465

[56] References Cited

U.S. PATENT DOCUMENTS

| 822,562 | 6/1906 | Tucker | 49/465 |
|---|---|---|---|
| 3,016,263 | 1/1962 | Rehmann | 296/137 E |
| 3,311,406 | 3/1967 | Fritsch | 296/137 J |
| 3,580,629 | 5/1971 | Heim | 296/137 B |
| 3,913,971 | 10/1975 | Green | 296/137 B |
| 3,975,049 | 8/1976 | Niess ner | 296/137 B |

Primary Examiner—Robert R. Song
Attorney, Agent, or Firm—Harvey C. Nienow

[57] ABSTRACT

A roof structure for an automobile wherein an opening is provided in the sheet metal roof and a reinforcing-mounting member formed of plastic is provided about said opening adjacent said roof and firmly secured to the support means for the roof. Such reinforcing-mounting member is formed with a U-shaped continuous channel adjacent the marginal edge of the opening in the roof to receive the offset marginal edge of a lid which is secured over the opening by suitable clamping means. Sealing means is provided within the continuous channel adjacent the offset marginal edge of the lid, and a wind deflector is provided for insertion in such channel to be firmly retained there when the lid is removed.

5 Claims, 7 Drawing Figures

U.S. Patent  Sept. 12, 1978  4,113,303
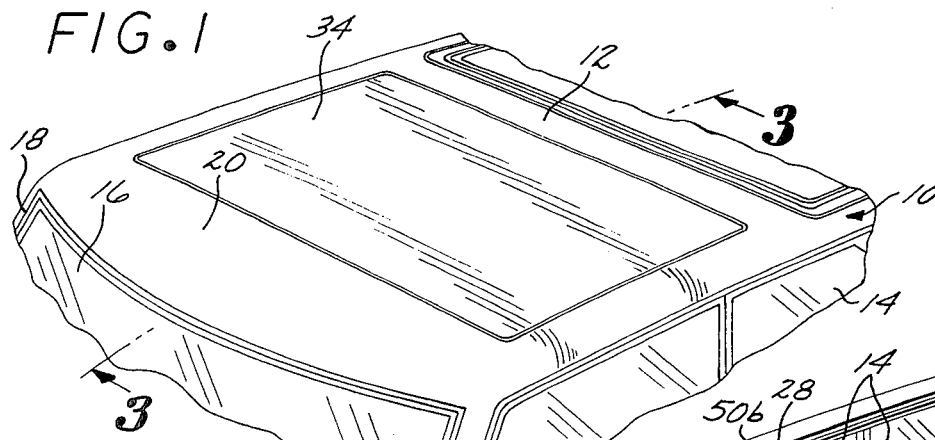
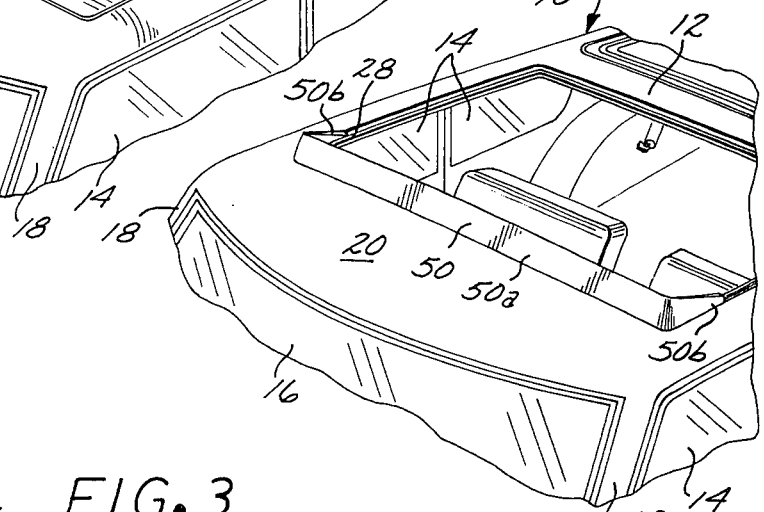
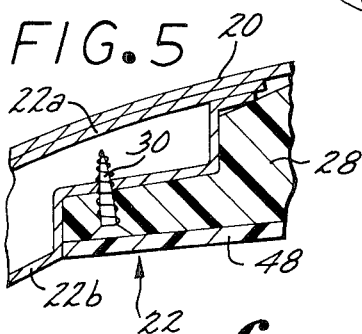
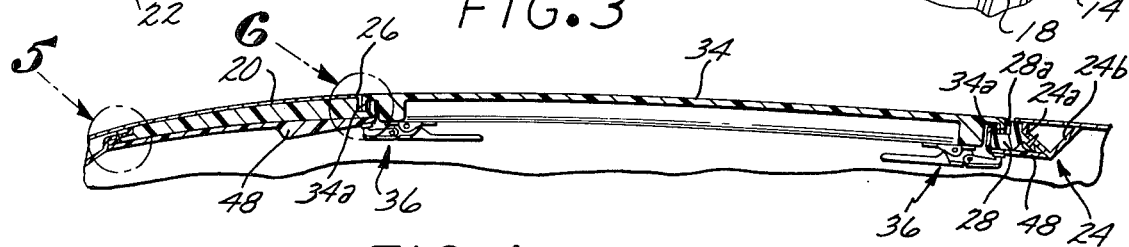
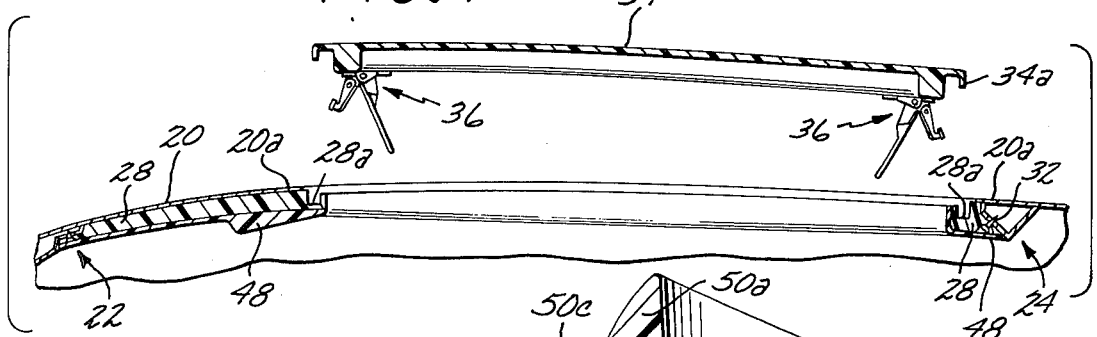
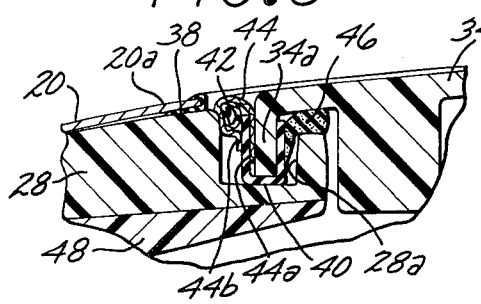
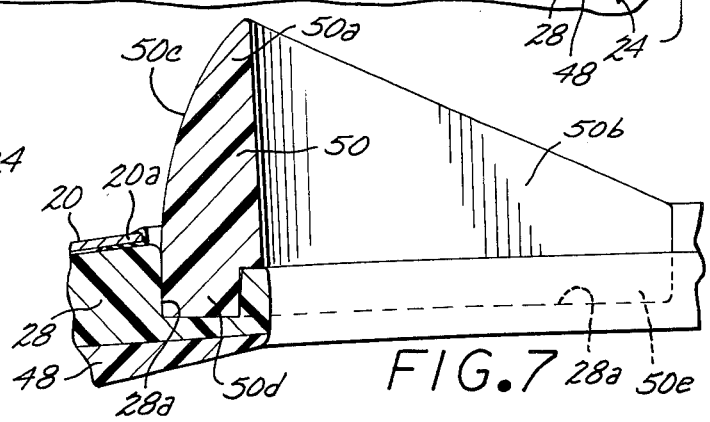

ROOF STRUCTURE FOR AN AUTOMOBILE

The present invention relates generally to a roof structure for an automobile, but more particularly to such a structure for enabling a section of the automobile roof to be removed, as desired.

Within the past several decades or so, certain automobiles have been manufactured with sun roofs whereby a cover member may be moved to an open position enabling occupants of the automobile to have access to the out-of-doors through the roof. Such sun roofs have been manufactured for certain types of automobiles, but for other styles of cars, they have not been provided because of the basic structure of the roof itself. That is, certain cars have been so constructed that heretofore it has not been feasible to cut an opening in the roof because the roof would thereby be greatly weakened.

It is an object of the present invention to provide a roof structure for an automobile which includes reinforcing means which is fastened to the strong structural support means for the roof to thereby add the necessary strength to the roof even though an opening is provided therein.

Another object of the present invention is to provide a roof structure for an automobile as characterized above wherein the reinforcing-mounting member is firmly secured to the normal sheet metal support means for the roof and extends beyond the marginal edge of an opening cut in the sheet metal roof.

Another object of the present invention is to provide a roof structure for an automobile as characterized above wherein a channel is provided in the reinforcing-mounting member to receive the marginal edge of a cover or lid.

An even further object of the present invention is to provide a roof structure for an automobile as characterized above wherein sealing means is provided between the channel and the marginal edge of the lid to prevent the ingress of moisture and other foreign material.

An even further object of the present invention is to provide a roof structure for an automobile as characterized above wherein a wind deflector is provided to be substituted for the cover or lid when the latter is completely removed.

A still further object of the present invention is to provide a roof structure for an automobile as characterized above wherein the deflector is held firmly within the channel of the reinforcing-mounting member.

A still further object of the present invention is to provide a roof structure for an automobile as characterized above which is inexpensive to manufacture and which is rugged and dependable in operation.

The novel features which I consider characteristic of my invention are set forth with particularity in the appended claims. The invention itself, however, both as to its organization and mode of operation, together with additional objects and advantages thereof, will best be understood from the following description of specific embodiments when read in connection with the accompanying drawings, in which:

FIG. 1 is a fragmentary perspective view of a roof structure according to the present invention;

FIG. 2 is a fragmentary perspective view showing the lid removed and a wind deflector in its place;

FIG. 3 is a fragmentary sectional view taken substantially along line 3—3 of FIG. 1;

FIG. 4 is a sectional view similar to FIG. 3 but showing the lid removed from the remaining roof members;

FIG. 5 is a fragmentary sectional view of area 5 of FIG. 3;

FIG. 6 is a fragmentary sectional view of area 6 of FIG. 3; and

FIG. 7 is a fragmentary sectional view through a portion of the deflector of FIG. 2.

Like reference characters indicate corresponding parts throughout the several views of the drawings.

Referring to FIG. 1 of the drawings, there is shown therein an automobile 10 having a roof structure 12, windows 14 and windshield 16. Roof structure 12 includes support posts 18 on either side of the windshield 16 and, as is well understood in the art, the roof 20 is supported by support means which extends about the periphery of the structure 12 and is secured to the underside of the roof 20 as shown most particularly in FIG. 3 of the drawings. As shown in greater detail, adjacent the upper portion of the windshield 16 and against the roof 20 is a generally rolled box section 22 which includes a generally flat member 22a and an offset member 22b. Members 22a and 22b are welded together in angularly offset relation as shown to provide a cross section of added bending strength as shown most particularly in FIG. 5 of the drawings.

In similar fashion, as shown most particularly in FIG. 3 of the drawings, there is a reinforcing support member 24 having several angularly offset members 24a and 24b which are secured to the undersurface of roof 20 as by welding, brazing, soldering or the like, to provide a strong support member having high bending strength. Although not shown in detail in the drawings, the roof structure 12 also includes similar roll-formed support members along the sides of the roof 20, and these are firmly secured to and tied in with the support members 22 and 24 to provide a continuous roof support.

As shown in the drawings, the roof 20 is provided with a through opening 26. This opening may be formed in roof 20 by the use of a cutting tool or burning tool, as desired. However, with such opening 26, the roof 20 is weakened appreciably at or near the marginal edge 20a of such opening.

A reinforcing-mounting member 28 formed of plastic having glass fibers imbedded therein for purposes of strength, is provided about the entire opening 26 in roof 20. Such member 28 may be formed by any suitable process such as molding or the like, and is provided with sufficient rigidity and strength as to provide support for the roof 20.

The reinforcing-mounting member 28, as shown most particularly in FIG. 5 of the drawings, is firmly secured to the aforementioned support member 22 in any appropriate manner as by welding or the like, but is shown in FIG. 5 as being secured by the use of sheet metal screws 30 which extend through suitably formed openings in member 28 and corresponding openings in member 22b of support means 22.

In similar fashion, as shown most particularly in FIGS. 3 and 4 of the drawings, the rearward portion of member 28 is secured by sheet metal screws 32 to the support means 24. Although not shown in the drawings, the side portions of the reinforcing-mounting member 28 are secured in similar fashion to the side support members for the roof 20.

It should be particularly noted that the reinforcing-mounting member 28 is precast with the proper curvature and shape so as to reinforce the roof 20 when firmly secured to the supports 20, 24 and the like as above described.

Member 28, as shown most particularly in FIG. 6 of the drawings, is formed with a U-shaped channel 28a about its marginal edge, adjacent the marginal edge 20a of the opening 26. Such channel 28a is continuous and is formed to receive and retain a cover comprising a lid 34. Such lid is formed with an offset continuous marginal edge 34a which extends downwardly into the channel 28a. Suitable clamping means as shown at 36 is provided on lid 34 for cooperation with the roof members to retain the lid in mounted position as shown in FIG. 3 of the drawings.

To properly finish the marginal edge 20a of opening 26, a flexible generally U-shaped sealing member 38 is interposed between the roof 20 and member 28 in a generally wrap-around fashion. Such flexible sealing member 38 extends along the marginal edge 20a and is firmly pressed between the roof 20 and member 28 to prevent the ingress of moisture or other foreign material.

As shown in FIG. 6 of the drawings, a generally U-shaped member 40 formed of rubber, plastic or the like, is provided about the offset continuous marginal edge 34a of lid 34. A generally tubular plastic sealing member 42 is fixed to one leg of the U-shaped member 40 by a plastic or cloth member 44 which is secured at its opposite marginal edges 44a and 44b to opposite sides of such leg of U-shaped member 40.

A sponge rubber sealing member 46 is also secured to the U-shaped member 40 to be compressed between the member 28 and the underside of lid 34 along the entire periphery of the lid as shown most particularly in FIG. 6 of the drawings.

A plastic finishing member 48 is secured to the underside of reinforcing-mounting member 28 to provide a pleasing appearance for the interior of the finished roof structure. Such finishing member 48 may be covered with cloth, plastic or the like, to provide the desired appearance.

As shown most particularly in FIG. 3 of the drawings, each of the clamping devices 36 is secured to the lid 34 and operates to provide a force against the finishing member 48 as shown. By suitable manipulation of each clamping device, it can be opened to permit the entire lid to be removed from within the peripheral channel 28a of member 28. The aforedescribed sealing means about the offset marginal edge 34a of lid 34 is thereby removed.

A wind deflector 50 having an intermediate portion 50a and a pair of angularly offset side portions 50b is provided. Wind deflector 50 is formed of plastic or other suitable material and is formed with a generally arcuate forward surface 50c for deflecting the wind encountered during forward motion of the automobile 10. Such deflector 50 fits firmly within a portion of the aforedescribed continuous channel 28 as shown most particularly in FIG. 7 of the drawings. It is formed with an extension 50d which is of such size and shape as to snugly fit within channel 28a so as to be firmly retained therein against the forces applied by the wind.

Thus, it is a simple matter to open the clamping means 36 and remove the lid 34 from the reinforcing-mounting member 28, and thereafter to insert the wind deflector 50 in the forward portion of the U-shaped channel 28a as shown most particularly in FIGS. 2 and 7 of the drawings. Occupants of the automobile 10 can thereby enjoy sunshine and free circulation of outside air. Conversely, when it is desired to again provide the continuous roof, the deflector can be lifted from the channel 28a and the lid 34 returned to its mounted position as shown most particularly in FIG. 3 of the drawings.

It is thus seen that the present invention provides a roof structure for an automobile which is unique and unusual. Although I have shown and described certain specific embodiments of my invention, I am well aware that many modifications thereof are possible. The invention, therefore, is not to be restricted except insofar as is necessitated by the prior art and by the spirit of the appended claims.

I claim:

1. A roof structure for an automobile comprising in combination, a sheet metal roof having spaced sheet metal support sections and formed with an opening, a reinforcing-mounting member formed of plastic material and secured to said support sections to extend along the marginal edge of said opening to reinforce said roof from said support sections to the marginal edge of said opening, said member being formed with a U-shaped channel adjacent the marginal edge of said opening, a cover for said opening comprising a plastic lid formed with an angularly offset marginal edge insertable into the channel of said reinforcing-mounting member, sealing means comprising a generally U-shaped flexible sealing element about said marginal edge of said lid and a generally tubular seal interposed between said element and the side wall of said channel, said sealing means further including a sealing device interposed between said reinforcing-mounting member and the undersurface of said lid adjacent said marginal edge, a generally U-shaped plastic wind deflector having a main portion and a pair of angularly disposed opposite side portions formed intergrally therewith for insertion within said channel when said cover is removed from said roof, the main and opposite side portions of said deflector each having an extension formed complementally of said channel to fit within and to be retained by the sides of said channel against external forces on said deflector, and clamp means for securing said cover to said reinforcing-mounting member.

2. A roof structure for an automobile comprising in combination, a sheet metal roof formed with an opening, a reinforcing-mounting member formed of plastic material and secured to said roof along the marginal edge of said opening, said member being formed with a U-shaped channel adjacent the marginal edge of said opening, a cover for said opening comprising a plastic lid formed with an angularly offset marginal edge insertable into the channel of said reinforcing-mounting member, sealing means comprising a generally U-shaped flexible sealing element about said marginal edge of said lid and a generally tubular seal interposed between said element and the side wall of said channel, said sealing means further including a sealing device interposed between said reinforcing-mounting member and the undersurface of said lid adjacent said marginal edge, and clamp means for securing said cover to said reinforcing-mounting member.

3. A roof structure for an automobile according to claim 2, wherein a wind deflector is provided for insertion within said channel of said reinforcing-mounting member when said cover is removed therefrom.

4. A roof structure for an automobile according to claim 3, wherein said reinforcing-mounting member extends about the marginal edge of said opening in said roof and said channel is continuous and adjacent to said edge.

5. A roof structure for an automobile according to claim 4, wherein said sealing element and said tubular seal are continuous to provide an uninterrupted seal about said lid.

* * * * *